US012637322B2

(12) United States Patent
Kattainen et al.

(10) Patent No.: US 12,637,322 B2
(45) Date of Patent: May 26, 2026

(54) ELEVATOR COMMUNICATION SYSTEM

(71) Applicant: KONE Corporation, Helsinki (FI)

(72) Inventors: Ari Kattainen, Helsinki (FI); Ferenc Staengler, Helsinki (FI); Juha-Matti Aitamurto, Helsinki (FI); Gergely Huszak, Helsinki (FI)

(73) Assignee: KONE CORPORATION, Helsinki (FI)

( * ) Notice: Subject to any disclaimer, the term of this patent is extended or adjusted under 35 U.S.C. 154(b) by 655 days.

(21) Appl. No.: 17/959,783

(22) Filed: Oct. 4, 2022

(65) Prior Publication Data

US 2023/0024201 A1     Jan. 26, 2023

Related U.S. Application Data

(63) Continuation of application No. PCT/FI2021/050004, filed on Jan. 4, 2021.

(30) Foreign Application Priority Data

Apr. 30, 2020  (EP) ..................................... 20172438
Oct. 21, 2020  (EP) ..................................... 20203069

(51) Int. Cl.
    *B66B 1/34*        (2006.01)
    *B66B 1/24*        (2006.01)
                (Continued)

(52) U.S. Cl.
    CPC ............ *B66B 1/343* (2013.01); *B66B 1/2466* (2013.01); *B66B 1/3453* (2013.01); *B66B 1/3461* (2013.01); *B66B 5/0031* (2013.01);

*B66B 13/22* (2013.01); *H04L 12/40182* (2013.01); *H04L 12/40195* (2013.01); *B66B 2201/30* (2013.01)

(58) Field of Classification Search
    CPC ..... B66B 1/343; B66B 1/2466; B66B 1/3453; B66B 1/3461; B66B 5/0031; B66B 13/22; B66B 2201/30; H04L 12/40182; H04L 12/40195; H04L 2012/40267
    See application file for complete search history.

(56) References Cited

U.S. PATENT DOCUMENTS

| 5,387,769 | A | 2/1995 | Kupersmith et al. |
| 6,973,029 | B1 | 12/2005 | Jantzen |

(Continued)

FOREIGN PATENT DOCUMENTS

WO    WO2018/134205 A1    7/2018

OTHER PUBLICATIONS

International Search Report, issued in PCT/FI2021/050004, dated Mar. 29, 2021.

(Continued)

*Primary Examiner* — John D Blanton
(74) *Attorney, Agent, or Firm* — Birch, Stewart, Kolasch & Birch, LLP

(57)     ABSTRACT

According to an aspect, there is provided an elevator communication system. The system includes an elevator controller, a first ethernet bus portion connected to a first port of the elevator controller, a second ethernet bus portion connected to a second port of the elevator controller, and at least one elevator system node communicatively connected to the elevator controller via the first ethernet bus portion and the second ethernet bus portion.

17 Claims, 3 Drawing Sheets

(51) Int. Cl.
    *B66B 5/00*        (2006.01)
    *B66B 13/22*     (2006.01)
    *H04L 12/40*    (2006.01)

(56) References Cited

U.S. PATENT DOCUMENTS

| | | | |
|---|---|---|---|
| 10,845,787 B1* | 11/2020 | Malaspina | G06F 9/4401 |
| 2002/0021659 A1* | 2/2002 | Meijen | H04Q 11/0062 |
| | | | 370/217 |
| 2007/0076768 A1* | 4/2007 | Chiesa | H04B 10/2725 |
| | | | 370/539 |
| 2007/0165658 A1* | 7/2007 | Mutoh | H04L 12/4637 |
| | | | 370/403 |
| 2007/0168077 A1* | 7/2007 | Schuster | G05B 19/4061 |
| | | | 700/170 |
| 2009/0016366 A1* | 1/2009 | Endo | H04L 45/22 |
| | | | 370/401 |
| 2009/0228575 A1* | 9/2009 | Thubert | H04W 40/28 |
| | | | 709/220 |
| 2011/0162913 A1* | 7/2011 | Kattainen | B66B 13/16 |
| | | | 187/280 |
| 2012/0259475 A1* | 10/2012 | Scharnick | G07C 9/20 |
| | | | 700/292 |
| 2013/0077473 A1* | 3/2013 | Ojha | H04L 12/4662 |
| | | | 370/221 |
| 2013/0322867 A1* | 12/2013 | Ibach | H04Q 11/0062 |
| | | | 398/2 |
| 2015/0003230 A1* | 1/2015 | Mitsumori | H04L 45/22 |
| | | | 370/218 |
| 2015/0090534 A1* | 4/2015 | Finschi | B66B 1/2466 |
| | | | 187/384 |
| 2015/0124837 A1* | 5/2015 | Saltsidis | H04L 45/586 |
| | | | 370/419 |
| 2015/0172097 A1* | 6/2015 | Melman | H04L 41/0668 |
| | | | 370/225 |
| 2016/0080193 A1* | 3/2016 | Waldo | H04L 41/06 |
| | | | 370/241.1 |
| 2016/0173342 A1* | 6/2016 | Latham | H04L 41/22 |
| | | | 715/735 |
| 2017/0242693 A1* | 8/2017 | Izaki | G06F 9/226 |
| 2017/0308048 A1* | 10/2017 | Weber | G05B 19/0423 |
| 2018/0309615 A1* | 10/2018 | Batra | H04L 43/062 |
| 2019/0280926 A1* | 9/2019 | Miklós | H04W 48/00 |
| 2020/0033840 A1* | 1/2020 | Balasubramanian | G05B 9/03 |
| 2020/0079619 A1 | 3/2020 | Thum et al. | |
| 2020/0103865 A1* | 4/2020 | Newton | G05B 19/0426 |
| 2020/0106639 A1* | 4/2020 | Pannell | H04L 12/40136 |
| 2021/0200178 A1* | 7/2021 | Mishra | H04L 9/3239 |
| 2023/0024201 A1* | 1/2023 | Kattainen | B66B 1/3453 |
| 2023/0027318 A1* | 1/2023 | Kattainen | B66B 1/2466 |

OTHER PUBLICATIONS

Written Opinion of the International Searching Authority, issued in PCT/FI2021/050004, dated Mar. 29, 2021.

Chinese Office Action and Search Report for Chinese Application No. 202180031290.4, dated Feb. 25, 2025.

\* cited by examiner

ELEVATOR COMMUNICATION SYSTEM

CROSS REFERENCE TO RELATED APPLICATIONS

This application is a Continuation of PCT International Application No. PCT/FI2021/050004, filed on Jan. 4, 2021, which claims priority under 35 U.S.C. 119(a) to patents application Nos. 20172438.2, filed in the European Patent Office on Apr. 30, 2020 and 20203069.8, filed in the European Patent Office on Oct. 21, 2020 all of which are hereby expressly incorporated by reference into the present application.

TECHNICAL FIELD

The present application relates to the field of elevator communication systems.

BACKGROUND

In modern elevator system, more and more data is sent and received by different entities of an elevator system. For example, an elevator controller may receive information from call buttons and then control an elevator drive to serve calls, or the elevator controller may receive information from a safety circuit and then based on this information control one or more entities of the elevator system. These are only some possible examples of situations where information is received and/or sent within an elevator system.

It is characteristic for the modern elevator systems that an elevator system may comprise multiple different internal data transmission solutions. This may mean that multiple different protocol stacks and multiple different physical layers may be used simultaneously. The use of multiple different internal data transmission solutions may result in a complicated and inefficient solution.

Further, a redundant safety bus system may be implemented using, for example, a CAN protocol or with RS485 time triggered protocol (TTS). It has duplicated communication channels, both with the same structure and same data communicated. In this solution two parallel communication channels are needed for safety reasons. These techniques, however, cannot be used when an elevator communication system uses, for example, an ethernet bus based communication.

Thus, it would be beneficial to have a solution that would alleviate at least one of these drawbacks.

SUMMARY

According to a first aspect, there is provided an elevator communication system comprising an elevator controller, a first ethernet bus portion connected to a first port of the elevator controller, a second ethernet bus portion connected to a second port of the elevator controller; and at least one elevator system node communicatively connected to the elevator controller via the first ethernet bus portion and the second ethernet bus portion. This enables a solution in which communication capability between elements in the elevator communication system is maintained even if one of the first or second ethernet bus portions is faulty.

In an implementation form of the first aspect, the at least one elevator system node comprises a safety node arranged at a pit of an elevator shaft, the first ethernet bus portion comprises a point to point ethernet bus connected between the first port of the elevator controller and a first port of the safety node, the second ethernet bus portion comprises a multi-drop ethernet bus connected between the second port of the elevator controller and a second port of the safety node, and wherein the elevator communication system further comprises at least one landing node connected to the multi-drop ethernet bus.

In an implementation form of the first aspect, at least one of the landing nodes is connected to a landing door sensor for determining a landing door status.

In an implementation form of the first aspect, the multi-drop ethernet bus is configured to extend to multiple landings.

In an implementation form of the first aspect, the first ethernet bus portion comprises sequential bus segments interconnected by at least one switch, the second ethernet bus portion comprises sequential bus segments interconnected by at least one switch, wherein second ethernet bus portion extends in the same elevator shaft with the first ethernet bus portion, and wherein a switch at the end of the first ethernet bus portion and a switch at the end of the second ethernet bus portion are interconnected to enable data transmission between the first ethernet bus portion and the second ethernet bus portion.

In an implementation form of the first aspect, the elevator communication system further comprises an ethernet bus segment between a switch of the first ethernet bus portion and a switch of the second ethernet bus portion.

In an implementation form of the first aspect, the ethernet bus segment comprises a multi-drop ethernet bus section.

In an implementation form of the first aspect, the ethernet bus segment comprises a point-to-point ethernet bus section.

In an implementation form of the first aspect, the elevator communication system further comprises a landing segment connected to the ethernet bus segment.

In an implementation form of the first aspect, each switch of the first ethernet bus portion and the corresponding switch of the second ethernet bus portion are arranged at different landings.

In an implementation form of the first aspect, each switch of the first ethernet bus portion and the corresponding switch of the second ethernet bus portion are arranged at the same landing.

In an implementation form of the first aspect, the first ethernet bus section and the second ethernet bus section comprise a point-to-point ethernet section.

In an implementation form of the first aspect, the first ethernet bus portion comprises sequential bus segments interconnected by at least one switch, the second ethernet bus portion comprises sequential bus segments interconnected by at least one switch, wherein second ethernet bus portion extends in the same elevator shaft with the first ethernet bus portion, and wherein the elevator communication system further comprises an ethernet bus segment between a switch of the first ethernet bus portion and a switch of the second ethernet bus portion.

In an implementation form of the first aspect, the ethernet bus segment comprises a multi-drop ethernet bus section.

In an implementation form of the first aspect, the ethernet bus segment comprises a point-to-point ethernet bus section.

In an implementation form of the first aspect, each switch of the first ethernet bus portion and the corresponding switch of the second ethernet bus portion are arranged at different landings.

In an implementation form of the first aspect, each switch of the first ethernet bus portion and the corresponding switch of the second ethernet bus portion are arranged at the same landing.

According to a second aspect, there is provided an elevator system comprising the elevator communication system of the first aspect.

BRIEF DESCRIPTION OF THE DRAWINGS

The accompanying drawings, which are included to provide a further understanding of the invention and constitute a part of this specification, illustrate embodiments of the invention and together with the description help to explain the principles of the invention. In the drawings.

DETAILED DESCRIPTION

The following description illustrates an elevator communication system that comprises an elevator controller, a first ethernet bus portion connected to a first port of the elevator controller, a second ethernet bus portion connected to a second port of the elevator controller, and at least one elevator system node communicatively connected to the elevator controller via the first ethernet bus portion and the second ethernet bus portion. This may enable a solution in which communication capability between elements in the elevator communication system is maintained even if one of the first or second ethernet bus portions is faulty. Further, elevator service and data communication in the elevator communication system does not have to be interrupted in case of a single failure in the elevator communication system.

Further, the term "communicatively connected" used herein may mean that an element or node may be directly connected to another element, node or bus or that it may be indirectly connected to the another element, node or bus via a connecting element, node or bus.

In an example embodiment, the various embodiments discussed below may be used in an elevator system comprising at least one elevator that is suitable and may be used for transferring passengers between landing floors of a building in response to service requests.

In another example embodiment, the various embodiments discussed below may be used in an elevator system comprising at least one elevator that is suitable and may be used for automated transferring of passengers between landings in response to service requests.

Figure 1A:
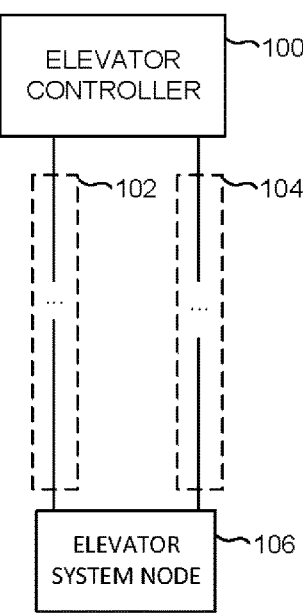
FIG. 1A illustrates an elevator communication system according to an example embodiment.

FIG. 1A illustrates an elevator communication system according to an example embodiment. The elevator communication system comprises an elevator controller 100, a first ethernet bus portion 102 connected to a first port of the elevator controller 100, a second ethernet bus portion 104 connected to a second port of the elevator controller 100, and at least one elevator system node 106 communicatively connected to the elevator controller 100 via the first ethernet bus portion 102 and the second ethernet bus portion 104. The first ethernet bus portion 102 may comprise, for example, a point-to-point ethernet bus, for example, a 100BASE-TX or 10BASET1L point-to-point ethernet bus. The second ethernet bus portion 104 may comprise, for example, a multi-drop ethernet bus, for example, a 10BASE-T1S multi-drop ethernet bus. The elevator system node 106 may be a pit node located in an elevator pit or a node arranged at a landing floor. Further, even if FIG. 1A may illustrate that the elevator communication system comprises only a single node connected to the elevator controller 100 via two separate ethernet bus portions, the elevator communication system may comprise more than one such node arranged at various locations in the system.

Figure 1B:
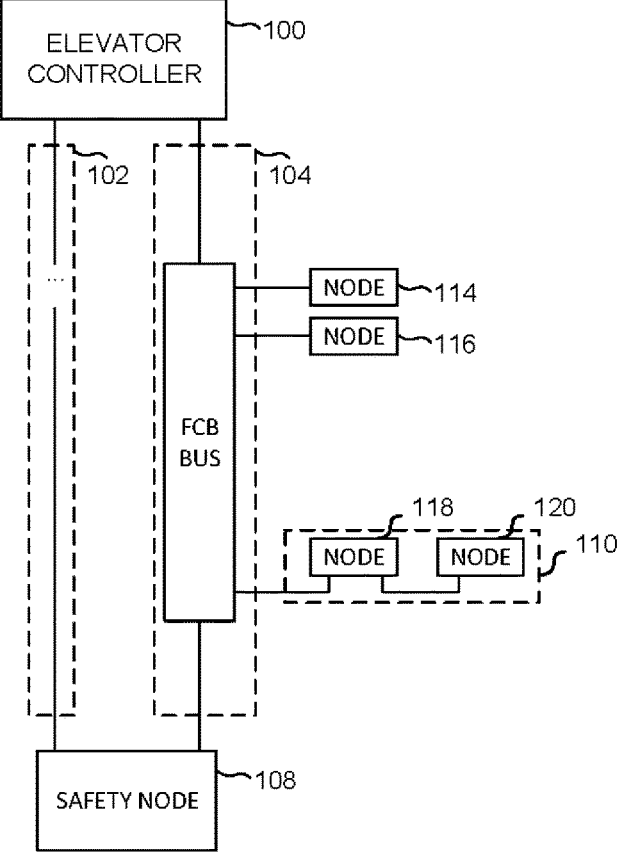
FIG. 1B illustrates an elevator communication system according to another example embodiment.

FIG. 1B illustrates an elevator communication system according to another example embodiment. The elevator communication system comprises an elevator controller 100, a first ethernet bus portion 102 connected to a first port of the elevator controller 100, a second ethernet bus portion 104 connected to a second port of the elevator controller 100, and a safety node 108 communicatively connected to the elevator controller 100 via the first ethernet bus portion 102 and the second ethernet bus portion 104. The safety node 108 may refer, for example, to a pit inspection node arranged at a pit.

The first ethernet bus portion 102 may comprise a point to point ethernet bus connected between the first port of the elevator controller 100 and a first port of the safety node 108. The second ethernet bus portion 104 may comprise a multi-drop ethernet bus connected between the second port of the elevator controller 100 and a second port of the safety node 108. The elevator communication system may also comprise at least one landing node 114, 116, 118, 120 connected to the multi-drop ethernet bus. In an example embodiment, at least one of the landing nodes may be connected to a landing door sensor for determining a landing door status. The first ethernet bus portion 102 may comprise, for example, a point-to-point ethernet bus, for example, a 100BASE-TX or 10BASET1L point-to-point ethernet bus. The second ethernet bus portion 104 may comprise, for example, a multi-drop ethernet bus, for example, a 10BASE-T1S multi-drop ethernet bus.

A landing node 114, 116, 118, 120 may comprise any node that may be used at a landing floor or may be associated with the landing floor, for example, a display, a call button, an indicator, a user interface device, a destination call panel, a safety contact, a voice intercom system, a camera etc. Further, as illustrated in FIG. 1B by a reference 110, a separate multi-drop ethernet bus segment may be connected to the second ethernet bus portion 104.

In an example embodiment, the second ethernet bus portion 104, for example, the multi-drop ethernet bus may be configured to extend to multiple landings. This may enable simple and effective solution for implementing the elevator communication system in the landings.

Figure 1C:
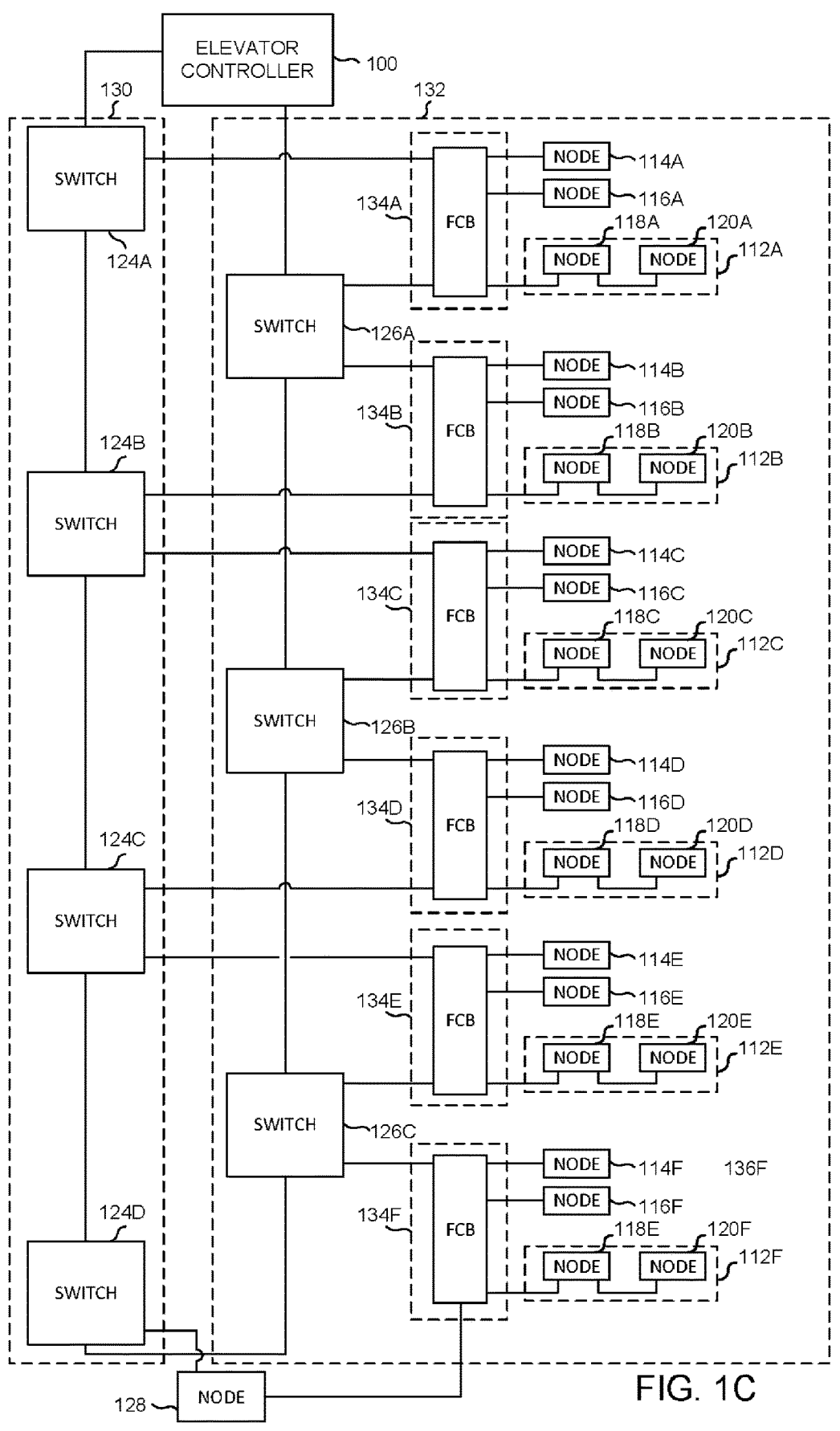
FIG. 1C illustrates an elevator communication system according to another example embodiment.

FIG. 1C illustrates an elevator communication system according to another example embodiment. The elevator communication system comprises an elevator controller 100, a first ethernet bus portion 130 connected to a first port of the elevator controller 100 and a second ethernet bus portion 132 connected to a second port of the elevator controller 100, and an elevator system node 128 communicatively connected to the elevator controller 100 via the first ethernet bus portion 130 and the second ethernet bus portion 132. The first ethernet bus portion 130 may comprise sequential bus segments interconnected by at least one switch 124A, 124B, 124C, 124D. The second ethernet bus portion 132 may comprise sequential bus segments interconnected by at least one switch 126A, 126B, 126C. The second ethernet bus portion 132 may extend in the same elevator shaft with the first ethernet bus portion 130. The switch 124D at the end of the first ethernet bus portion 130 and a switch 126C at the end of the second ethernet bus portion 132 may be interconnected to enable data transmission between the first ethernet bus portion 130 and the second ethernet bus portion 132. The interconnection between the switches 124D and 126C may be direct or indirect. Indirect here means that the switch 124D may be connected to the switch 126C via an intermediate node, as illustrated in FIG. 1C.

In an example embodiment, the first ethernet bus section 130 and the second ethernet bus section 132 comprise a point-to-point ethernet section or sections. The elevator controller 100 may be connected to the switches 124A and 126A via a point-to-point ethernet bus, and the connection between two subsequent switches in the first ethernet bus section 130 and the second ethernet bus section 132 may comprise a point-to-point ethernet bus. The point-to-point ethernet bus may comprise, for example, a 100BASE-TX or 10BASET1L point-to-point ethernet bus.

In an example embodiment, the elevator communication system may comprise an ethernet bus segment 134A-134F between a switch 124A, 124B, 124C, 124D of the first ethernet bus portion 130 and a switch 126A, 126B, 126C of the second ethernet bus portion 132. For example, as can be seen from FIG. 1C, the switch 124A of the first ethernet bus portion 130 may be connected to a first ethernet bus segment 134A. Similarly, the switch 126A of the second ethernet bus portion 132 may be connected to the same ethernet bus segment 134A. Then, the switch 126A of the second ethernet bus portion 132 may also be connected to a second ethernet bus segment 134B, and the second ethernet bus segment 134B may be connected to a further switch 124B of the first ethernet bus portion 130. As can be seen from FIG. 1C, the same structure (i.e. an ethernet bus segment between a switch of the first ethernet bus portion and a switch) may repeat in the elevator communication system.

In an example embodiment, the ethernet bus segment 134A-134F may comprise a multi-drop ethernet bus section. When implementing a multi-drop ethernet bus section, the multi-drop ethernet bus section may act as a landing segment, and a variety of different elevator system nodes 114A-114F, 116A-116F, 118A-118F, 120A-120F can be easily connected to the multi-drop ethernet bus section. Further, as can be seen from FIG. 1C, another multi-drop ethernet bus section 112A-112F connected to the ethernet bus segment 134A-134F may comprise one or more elevator system nodes 118A-118E, 120A-120F connected to the multi-drop ethernet bus section 112A-112F. In another example embodiment, the ethernet bus segment may comprise a point-to-point ethernet bus section. The multi-drop ethernet bus may comprise, for example, a 10BASE-T1S multi-drop ethernet bus.

In an example embodiment, each switch 124A-124D of the first ethernet bus portion 130 and the corresponding switch 126A, 126B, 126C of the second ethernet bus portion 132 may are arranged at different landings or at the same landing. This provides a versatile solution that enables implementing the elevator communication system differently in different environments.

A landing node 114A-114F, 116A-116F, 118A-118F, 120A-120F may comprise any node that may be used at a landing floor or may be associated with the landing floor, for example, a display, a call button, an indicator, a user interface device, a destination call panel, a safety contact, a voice intercom system, a camera etc.

Figure 1D:
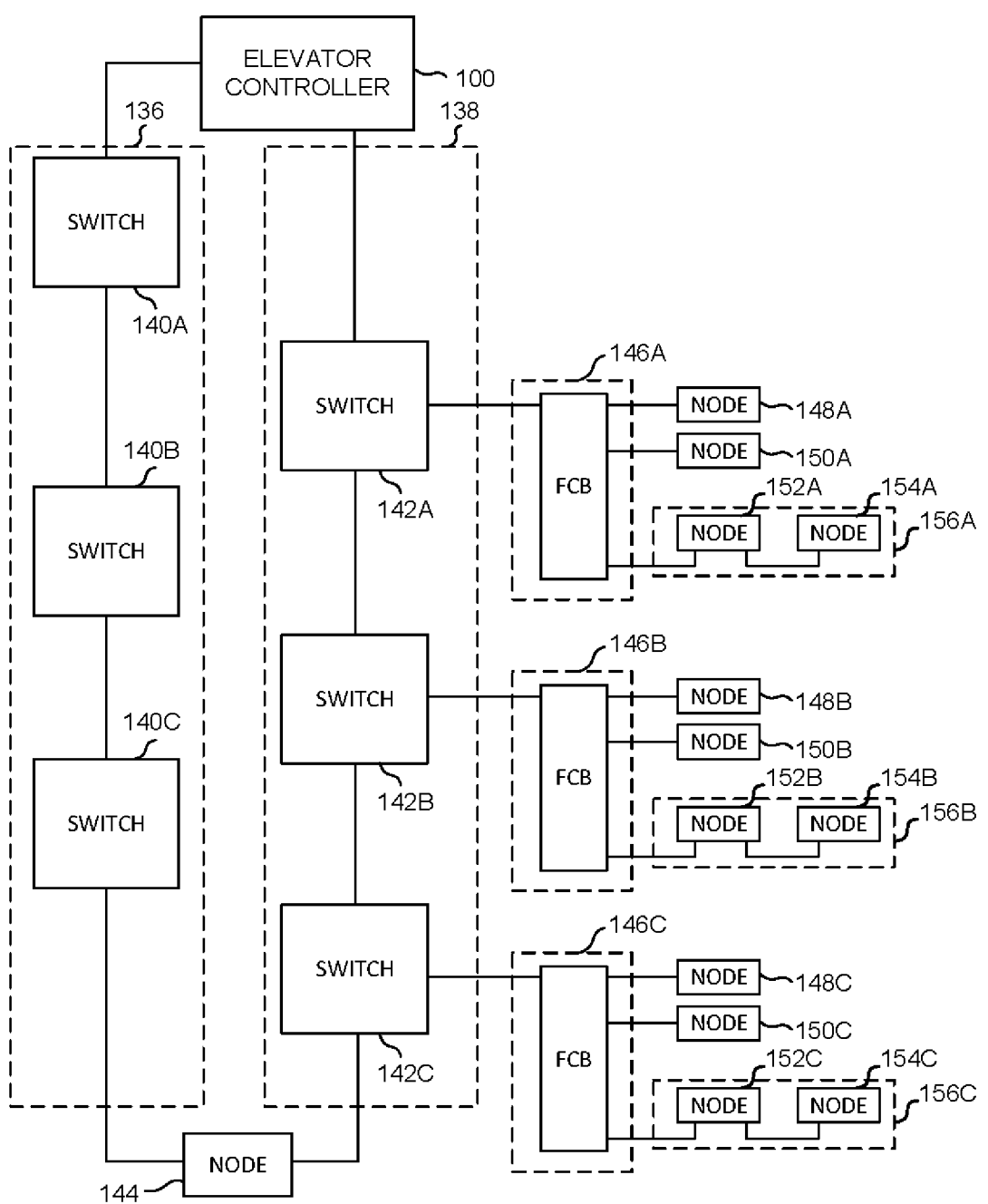
FIG. 1D illustrates an elevator communication system according to another example embodiment.

FIG. 1D illustrates an elevator communication system according to another example embodiment. The elevator communication system comprises an elevator controller 100, a first ethernet bus portion 136 connected to a first port of the elevator controller 100 and a second ethernet bus portion 138 connected to a second port of the elevator controller 100, and an elevator system node 144 communicatively connected to the elevator controller 100 via the first ethernet bus portion 136 and the second ethernet bus portion 138. The first ethernet bus portion 136 may comprise sequential bus segments interconnected by at least one switch 140A, 140B, 140C. The second ethernet bus portion 138 may comprise sequential bus segments interconnected by at least one switch 142A, 142B, 142C. The second ethernet bus portion 138 may extend in the same elevator shaft with the first ethernet bus portion 136. The switch 140C at the end of the first ethernet bus portion 130 and a switch 142C at the end of the second ethernet bus portion 132 may be interconnected via an elevator system node 144 to enable data transmission between the first ethernet bus portion 136 and the second ethernet bus portion 138.

In an example embodiment, the first ethernet bus section 136 and the second ethernet bus section 138 may comprise a point-to-point ethernet section or sections. In other words, the elevator controller 100 may be connected to the switches 140A, 142A via a point-to-point ethernet bus, and the connection between two subsequent switches in the first ethernet bus section 136 and the second ethernet bus section 138 may comprise a point-to-point ethernet bus. The point-to-point ethernet bus may comprise, for example, a 100BASE-TX or 10BASET1L point-to-point ethernet bus.

In an example embodiment, the elevator communication system may comprise an ethernet bus segment 146A-146C connected to the switch 142A-142C of the second ethernet bus portion 138. In an example embodiment, the ethernet bus segment 146A-146C may comprise a multi-drop ethernet bus section. When implementing a multi-drop ethernet bus section, the multi-drop ethernet bus section may act as a landing segment, and a variety of different elevator system nodes 148A-148C, 150A-150C, 152-152C, 154A-154C can be easily connected to the multi-drop ethernet bus section. Further, as can be seen from FIG. 1D, another multi-drop ethernet bus section 156A-156C may comprise one or more elevator system nodes 152A-152C, 154A-154C connected to the multi-drop ethernet bus section 146A-146C. In another example embodiment, the ethernet bus segment may comprise a point-to-point ethernet bus section. The multi-drop ethernet bus may comprise, for example, a 10BASE-T1S multi-drop ethernet bus.

A landing node 148A-148C, 150A-150C, 152A-152C, 154A-154C may comprise any node that may be used at a landing floor or may be associated with the landing floor, for example, a display, a call button, an indicator, a user interface device, a destination call panel, a safety contact, a voice intercom system, a camera etc.

Further, one or more nodes illustrated in FIG. 1A, 1B, 1C or 1D may send information from sensors or fixtures to the elevator controller 100 and receive information therefrom to control, for example, actuators configure fixtures etc. One or more nodes illustrated in FIG. 1A, 1B, 1C or 1D may be safety nodes in accordance with IEC61508 SIL level 3, having a safety processing unit and a separate communication controller. The safety nodes may be configured to interface with elevator safety devices, such as safety sensors or safety contacts indicating elevator safety, e.g. landing door contacts, door lock contacts, contact of overspeed governor, buffer contacts etc.

Further, the elevator communication system discussed above may be implemented in an elevator system comprising one or more elevator shafts. Further, in an example embodiment, the elevator system may comprise a plurality of elevator cars configured to move independently in a same elevator shaft.

At least one of the above discussed embodiments may enable, for example, a solution with an improved reliability and availability of an all-ethernet elevator communication system. Further, elevator service and data communication in the elevator communication system does not have to be interrupted in case of a single failure in the elevator communication system.

Example embodiments may be implemented in software, hardware, application logic or a combination of software, hardware and application logic. The example embodiments can store information relating to various methods described herein. This information can be stored in one or more memories, such as a hard disk, optical disk, magneto-optical disk, RAM, and the like. One or more databases can store the information used to implement the example embodiments. The databases can be organized using data structures (e.g., records, tables, arrays, fields, graphs, trees, lists, and the like) included in one or more memories or storage devices listed herein. The methods described with respect to the example embodiments can include appropriate data structures for storing data collected and/or generated by the methods of the devices and subsystems of the example embodiments in one or more databases.

An elevator controller or an elevator system node discussed above may comprise a processor or processor, and the processor may comprise one or more general purpose processors, microprocessors, digital signal processors, micro-controllers, and the like, programmed according to the teachings of the example embodiments, as will be appreciated by those skilled in the computer and/or software art(s). Appropriate software can be readily prepared by programmers of ordinary skill based on the teachings of the example embodiments, as will be appreciated by those skilled in the software art. In addition, the example embodiments may be implemented by the preparation of application-specific integrated circuits or by interconnecting an appropriate network of conventional component circuits, as will be appreciated by those skilled in the electrical art(s). Thus, the examples are not limited to any specific combination of hardware and/or software. Stored on any one or on a combination of computer readable media, the examples can include software for controlling the components of the example embodiments, for driving the components of the example embodiments, for enabling the components of the example embodiments to interact with a human user, and the like. Such computer readable media further can include a computer program for performing all or a portion (if processing is distributed) of the processing performed in implementing the example embodiments. Computer code devices of the examples may include any suitable interpretable or executable code mechanism, including but not limited to scripts, interpretable programs, dynamic link libraries (DLLs), Java classes and applets, complete executable programs, and the like.

As stated above, the components of the example embodiments may include computer readable medium or memories for holding instructions programmed according to the teachings and for holding data structures, tables, records, and/or other data described herein. In an example embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer. A computer-readable medium may include a computer-readable storage medium that may be any media or means that can contain or store the instructions for use by or in connection with an instruction execution system, apparatus, or device, such as a computer. A computer readable medium can include any suitable medium that participates in providing instructions to a processor for execution. Such a medium can take many forms, including but not limited to, non-volatile media, volatile media, transmission media, and the like.

While there have been shown and described and pointed out fundamental novel features as applied to preferred embodiments thereof, it will be understood that various omissions and substitutions and changes in the form and details of the devices and methods described may be made by those skilled in the art without departing from the spirit of the disclosure. For example, it is expressly intended that all combinations of those elements and/or method steps which perform substantially the same function in substantially the same way to achieve the same results are within the scope of the disclosure. Moreover, it should be recognized that structures and/or elements and/or method steps shown and/or described in connection with any disclosed form or embodiments may be incorporated in any other disclosed or described or suggested form or embodiment as a general matter of design choice.

The applicant hereby discloses in isolation each individual feature described herein and any combination of two or more such features, to the extent that such features or combinations are capable of being carried out based on the present specification as a whole, in the light of the common general knowledge of a person skilled in the art, irrespective of whether such features or combinations of features solve any problems disclosed herein, and without limitation to the scope of the claims. The applicant indicates that the disclosed aspects/embodiments may consist of any such individual feature or combination of features. In view of the foregoing description it will be evident to a person skilled in the art that various modifications may be made within the scope of the disclosure.

The invention claimed is:

1. An elevator communication system, comprising:
an elevator controller;
a first ethernet bus portion connected to a first port of the elevator controller;
a second ethernet bus portion connected to a second port of the elevator controller; and
at least one elevator system node communicatively connected to the elevator controller via the first ethernet bus portion and the second ethernet bus portion,
wherein:
the first ethernet bus portion comprises sequential bus segments interconnected by at least one switch;
the second ethernet bus portion comprises sequential bus segments interconnected by at least one switch, wherein second ethernet bus portion extends in the same elevator shaft with the first ethernet bus portion;
wherein the elevator communication system further comprises an ethernet bus segment between a switch of the first ethernet bus portion and a switch of the second ethernet bus portion, and
wherein:
the at least one elevator system node comprises a safety node arranged at a pit of an elevator shaft, the first ethernet bus portion comprises a point to point ethernet bus connected between the first port of the elevator controller and a first port of the safety node, the second ethernet bus portion comprises a multi-drop ethernet bus connected between the second port of the elevator controller and a second port of the safety node, and the elevator communication system further comprises at least one landing node connected to the multi-drop ethernet bus, and wherein the switch of the first ethernet bus portion and the switch of the second ethernet bus portion are physically co-located at the same elevator landing, and the ethernet bus segment comprises a point-to-point cable connection between co-located ports of the respective switches.

2. The elevator communication system of claim 1, wherein at least one of the landing nodes is connected to a landing door sensor for determining a landing door status.

3. The elevator communication system of claim 1, wherein the multi-drop ethernet bus is configured to extend to multiple landings.

4. The elevator communication system of claim 2, wherein the multi-drop ethernet bus is configured to extend to multiple landings.

5. The elevator communication system according to claim 1, wherein a switch at the end of the first ethernet bus portion and a switch at the end of the second ethernet bus portion are interconnected to enable data transmission between the first ethernet bus portion and the second ethernet bus portion.

6. The elevator communication system of claim 5, wherein the ethernet bus segment comprises a multi-drop ethernet bus section.

7. The elevator communication system of claim 6, further comprising a landing segment connected to the ethernet bus segment.

8. The elevator communication system of claim 5, wherein the ethernet bus segment comprises a point-to-point ethernet bus section.

9. The elevator communication system of claim 5, further comprising a landing segment connected to the ethernet bus segment.

10. The elevator communication system of claim 5, wherein each switch of the first ethernet bus portion and the corresponding switch of the second ethernet bus portion are arranged at different landings.

11. The elevator communication system of claim 5, wherein each switch of the first ethernet bus portion and the corresponding switch of the second ethernet bus portion are arranged at the same landing.

12. The elevator system of claim 5, wherein the first ethernet bus section and the second ethernet bus section comprise a point-to-point ethernet bus section.

13. The elevator communication system of claim 1, wherein the ethernet bus segment comprises a multi-drop ethernet bus section.

14. The elevator communication system of claim 1, wherein the ethernet bus segment comprises a point-to-point ethernet bus section.

15. The elevator communication system of claim 1, wherein each switch of the first ethernet bus portion and the corresponding switch of the second ethernet bus portion are arranged at different landings.

16. The elevator communication system of claim 1, wherein each switch of the first ethernet bus portion and the corresponding switch of the second ethernet bus portion are arranged at the same landing.

17. An elevator system comprising the elevator communication system of claim 1.

* * * * *